I. S. & C. N. BROWN.
SAW.
No 62,813. Patented Mar. 12, 1867.
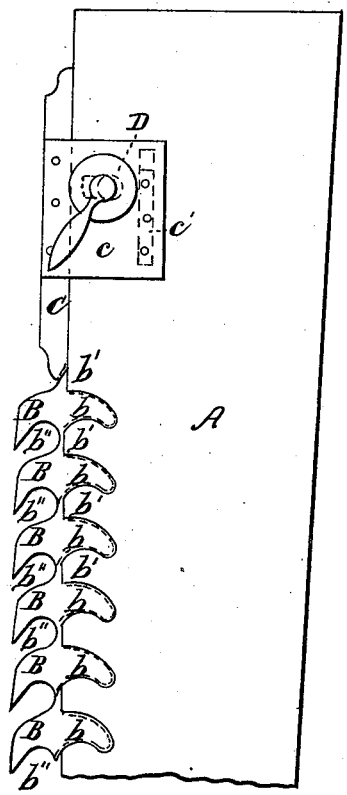
Witnesses:
Inventors:
Ira S. Brown.
Chas. N. Brown.

United States Patent Office.

IRA S. AND CHARLES N. BROWN, OF PROVIDENCE, RHODE ISLAND, ASSIGNORS TO THEMSELVES AND J. MASON GROSS.

Letters Patent No. 62,813, dated March 12, 1867.

---

IMPROVEMENT IN SAWS.

---

The Schedule referred to in these Letters Patent and making part of the same.

---

TO ALL WHOM IT MAY CONCERN:

Be it known that we, IRA S. and CHARLES N. BROWN, of Providence, in the county of Providence, and State of Rhode Island, have invented certain new and useful Improvements in Saws; and we do hereby declare that the following is a full and exact description of the same, reference being had to the accompanying drawing, which is a side elevation of a portion of a saw constructed according to our invention.

As all saws with removable teeth have heretofore been constructed, each tooth has required to be fastened independently, and thus the expense of the first construction was much increased and the labor of removing the teeth for sharpening was great, while the liability of derangement was in proportion to the number of teeth. By our improvement but one lock or fastening is required for a saw of any number of teeth, and the teeth are so supported that while that one lock is secure no tooth can be removed; but by loosening the said lock the teeth may all be removed in succession. The nature of our invention consists in the employment in saw teeth of a shank of hooking or equivalent form, whereby the resistance of the wood in sawing tends to force the said shank tighter into its socket, in combination with the interlocking of one tooth upon another in such a manner that no tooth can be removed without first removing the adjacent tooth, whereby a single lock only is required for any desired number of teeth, which lock is applied to the last tooth in the series, as shown in the drawings.

A is a saw plate, and B B B are teeth having shanks, $b$, of a hooking or curved form, fitting into properly prepared recesses in the plate A, the edges of the shanks being grooved and the edges of the recesses sharpened in the usual manner to prevent lateral displacement. This hook-formed shank $b$ is so formed and situate relatively to the acting point of the tooth that any outward and backward pressure upon the point tends to force the shank firmer into its socket. On the rear of each tooth is a projection, $b'$, extending back on the edge of the plate A to the next tooth, and on the front of the tooth is a projection, $b''$, which fits upon and overlaps the projection $b'$ of the preceding tooth, thereby preventing the removal of any tooth until the next succeeding tooth is first removed. As each tooth thus serves as a lock for the preceding tooth, when the last tooth in the series is fastened the whole series is locked and no one of them can be removed. We fasten the last tooth in the series in the following manner: A bolt, C, is fitted to slide upon the edge of the plate A, having guides, $e$, on either side, and a piece, $c'$, riveted thereto and adapted to slide in a slot in the plate A, as shown. This arrangement is such that, while the bolt C can slide longitudinally upon the plate A, it cannot be removed therefrom without destroying it. The end of the bolt C is adapted to fit upon the projection $b'$ of the last tooth in the series and thus hold it in place. A cam, D, is provided to operate the bolt C in a well-known manner. It will be seen that the strain upon each tooth due to the action of the tooth in sawing is received upon its own shank, the said action tending to force the tooth more firmly in place, but any tendency of the tooth to become loosened is resisted by the overlapping piece $b''$ of the succeeding tooth; and that any force exerted to remove a tooth in coming upon the succeeding tooth acts in the same manner upon the latter as does the resistance of the wood in sawing, viz, to force it more firmly into its socket. Thus the teeth are held in such a manner that while the last one of the series is securely locked no tooth in the series can be removed, and all strains thereon only tend to confine them the more firmly.

Having now fully described our invention, what we claim as new therein, and desire to secure by Letters Patent, is—

The combination of the curved shank $b$ with projections $b'$ $b''$, and means for locking or fastening the last tooth in the series, the whole operating together substantially in the manner and for the purpose above set forth.

IRA S. BROWN,
CHAS. N. BROWN.

Witnesses:
   G. H. BABCOCK,
   J. A. CLARKE.